United States Patent [19]

Nilssen

[11] Patent Number: 5,152,099

[45] Date of Patent: Oct. 6, 1992

[54] PLANT REJUVENATOR SYSTEM

[76] Inventor: Ole K. Nilssen, Caesar Dr., Barrington, Ill. 60010

[21] Appl. No.: 597,108

[22] Filed: Oct. 17, 1990

Related U.S. Application Data

[63] Continuation of Ser. No. 404,613, Sep. 8, 1989, abandoned, which is a continuation-in-part of Ser. No. 185,974, Apr. 25, 1988, abandoned.

[51] Int. Cl.$^5$ .............................................. A01G 31/02
[52] U.S. Cl. ....................................... 47/65; 108/21; 47/39
[58] Field of Search ..................... 47/39; 108/20, 21; 428/425, 522

[56] References Cited

U.S. PATENT DOCUMENTS

| | | | |
|---|---|---|---|
| 917,260 | 4/1909 | Cunningham | 108/21 |
| 1,009,452 | 11/1911 | Wright | 108/21 |
| 1,521,521 | 12/1924 | Flagg | 52/28 |
| 2,085,091 | 6/1937 | Fox | 47/40 |
| 2,209,858 | 7/1940 | Steiert | 108/21 |
| 2,628,722 | 2/1953 | Walsh | 108/21 |
| 3,319,378 | 5/1967 | Andrews | 47/40 |
| 4,045,911 | 9/1977 | Ware | 47/39 |
| 4,051,627 | 10/1977 | Schilling | 47/39 |
| 4,146,993 | 4/1979 | Freeman | 47/17 |
| 4,227,343 | 10/1980 | Espy | 47/67 |
| 4,244,145 | 1/1981 | Polacsek | 47/17 |
| 4,288,948 | 9/1981 | Harris | 52/28 |
| 4,543,744 | 10/1985 | Royster | 47/17 |
| 4,817,332 | 4/1989 | Ikeda | 47/DIG. 6 |

FOREIGN PATENT DOCUMENTS

| | | | |
|---|---|---|---|
| 118744 | 9/1918 | United Kingdom | 47/39 |
| 2067837 | 1/1980 | United Kingdom | 47/39 |

OTHER PUBLICATIONS

Indoor Gardens with Controlled Lighting Bulletin No. 187 of U.S.D.O.A. May 1971.

Primary Examiner—Henry E. Raduazo

[57] ABSTRACT

Particularly for use in wintertime, a plant rejuvenator is provided in the form of a wall-hung shelf that is internally covered with reflective material. Along the rear wall of the shelf, in front of the reflective material, is positioned an array of fluorescent lamps. Within the shelf, in front of the fluorescent lamps, is placed one or more potted plants; each plant positioned on an automatically rotating pot-base. Covering the front of the shelf is a partially transparent folding door. When closed, the door reflects some 90% of the light impinging upon it, but lets through the remaining 10%. A ventilation fan is arranged to maintain the temperature within the shelf at an optimum level. An automatic watering and feeding arrangement maintains the soil of each potted plant such as to promote effective plant growth. The light provided in intense enough to sustain a high degree of plant growth. The automatic rotation of the pots provides for even exposure to light. A plant may be placed in the plant rejuvenator for the purpose of display and/or for the purpose of being rejuvenated such as to permit it to remain in a healthy state outside of the rejuvenator for an extended period. Typically, a plant would be kept in the rejuvenator for a week or so. Thereafter, the plant would be able to maintain a good state of health for perhaps two weeks or so even if kept outside of the rejuvenator in wintertime.

14 Claims, 2 Drawing Sheets

WINDOW-LIKE PLANT REJUVENATOR SYSTEM

PLANT REJUVENATOR SYSTEM

BACKGROUND OF THE INVENTION

Related Application

This is a continuation of Ser. No. 404,613 filed Sep. 8, 1989 and now abandoned which is a continuation-in-part of Ser. No. 07/185,974 filed Apr. 25, 1988 and now abandoned.

1. Field of the Invention

Broadly, the present invention relates to photic means for promoting growth of plants.

More particularly, the invention relates to means for rejuvenating potted plants by way of controllably subjecting these plants to light provided by fluorescent lamps.

2. Description of Prior Art

It is well known that artificial light may be used for promoting plant growth. Special lamps and lighting products are available for purchase, as are so-called terrariums wherein plants are exposed to rather intense fluorescent light while being automatically watered and fed.

Hydroponics systems frequently rely on artificial light to effect plant growth. One particular hydroponics system, the so-called Geniponics system, is described in the November 1987 issue of IEEE Spectrum.

General Purpose of Present Invention

The general purpose of the present invention is that of providing for a system whereby potted plants and the like can be maintained in and/or rejuvenated to a high state of health by way of subjecting them to a high degree of illumination while at the same time providing for proper watering and feeding.

SUMMARY OF THE INVENTION

Objects of the Invention

An object of the present invention is the provision of cost-effective means whereby potted plants can conveniently be brought into and/or maintained in a high state of health even in an environment where sunshine is substantially absent.

This as well as other objects, features and advantages of the present invention will become apparent from the following description and claims.

Brief Description

Particularly for use in situations where natural sunlight is scarce, a plant rejuvenator is provided in the form of a wall-hung shelf that is internally covered with reflective material. Along the rear wall of the shelf, in front of the reflective material, is positioned an array of fluorescent lamps. Within the shelf, in front of the fluorescent lamps, is placed one or more potted plants; each plant positioned on an automatically rotating pot-base. Covering the front of the shelf is a partially transparent folding door. When closed, the door reflects some 90% of the light impinging upon it, but lets through the remaining 10%. A ventilation fan is arranged to maintain the temperature within the shelf at an optimum level. An automatic watering and feeding arrangement maintains the soil of each potted plant such as to promote effective plant growth. The light provided is intense enough to sustain a high degree of plant growth. The automatic rotation of the pots provides for even exposure to light. A plant may be placed in the plant rejuvenator for the purpose of display and/or for the purpose of being rejuvenated such as to permit it to remain in a healthy state outside of the rejuvenator for an extended period. Typically, a plant would be kept in the rejuvenator for a week or so. Thereafter, the plant would be able to maintain a good state of health for perhaps two weeks or so even if kept outside of the rejuvenator with but limited exposure to light.

DESCRIPTION OF THE PREFERRED EMBODIMENT

Details of Construction

FIG. 1 schematically illustrates the preferred embodiment of the invention in its most basic form.

Figure 1A:
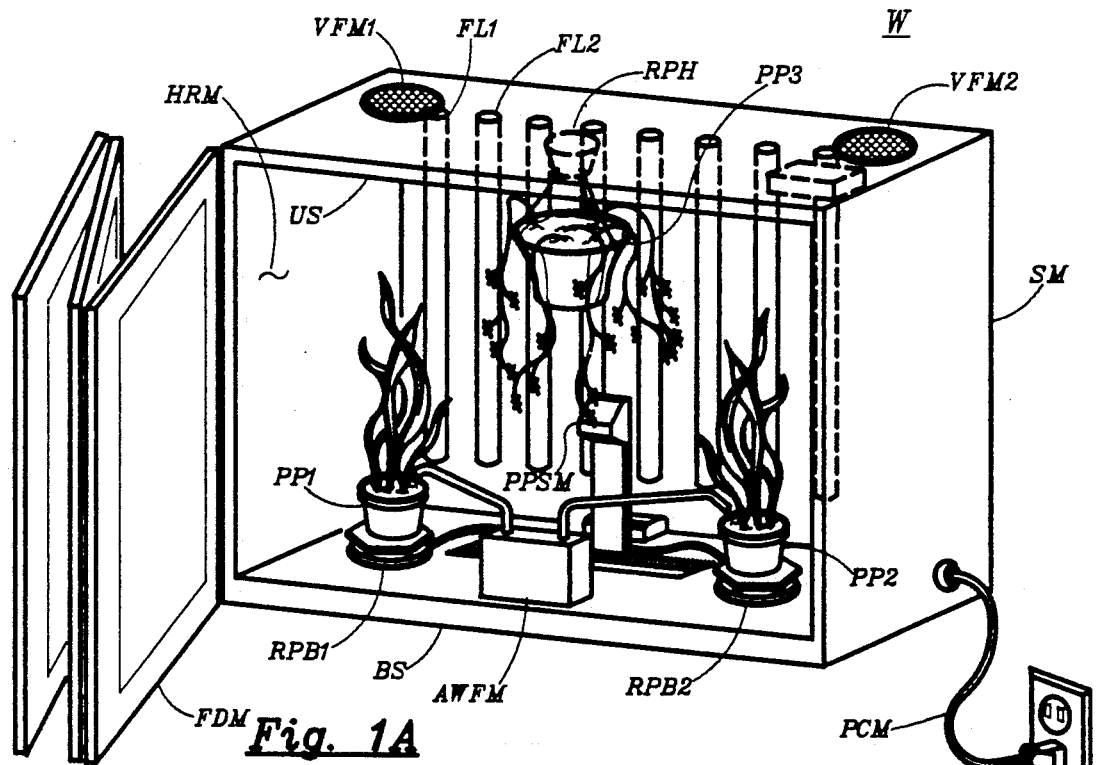
FIG. 1 diagrammatically illustrates the invention in its preferred embodiment.
Figure 1C:
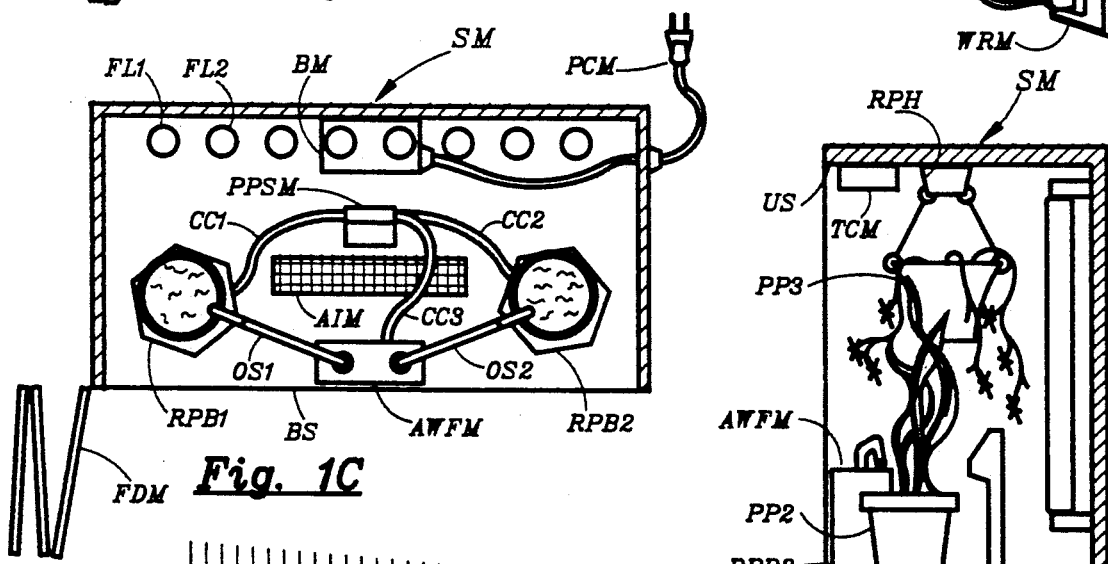
Figure 1B:
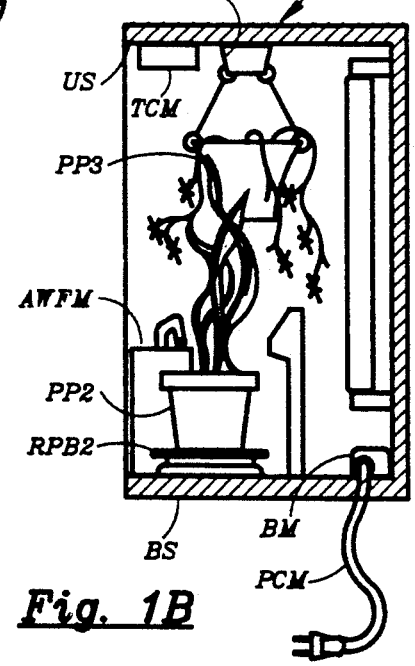

FIG. 1A illustrates the invention by way of a predominantly frontal perspective view; FIG. 1B illustrates the invention by way of a horizontal cross-sectional view; and FIG. 1C illustrates the invention by way of a vertical cross-sectional side-view.

In FIG. 1, a substantially rectangular parallelepiped-shaped shelf means SM is hanging on a wall W. The front of the shelf means is open, but may be covered with a folding door means FDM. The internal surfaces of all the walls of the shelf means are covered with a highly reflective material HRM. The folding door means is made of so-called one-way mirrors; which is to say, the door means is made of material that transmits a relatively small part of the light impinging upon it, reflecting the rest.

Plural fluorescent lamps FL1, FL2 are mounted close to the inside back wall of the shelf means; which plural fluorescent lamps are powered by way of a ballasting means BM; which ballasting means is connected with an ordinary wall receptacle means WRM by way of a power cord means PCM.

On the bottom shelf BS of the shelf means are positioned two rotating pot-bases RPB1 and RPB2 on which are placed potted plants PP1 and PP2, respectively. Fastened to the upper shelf US of the shelf means is a rotating pot-hanger RPH, from which is hung a potted plant PP3. The pot-bases as well as the pot-hanger are all connected with a programmable power supply means PPSM by way of connect cords, such as CC1 and CC2.

Ventilation fan means VFM1 and VFM2 are located in the upper shelf and are connected with the power supply cord means by way of a thermostat control means TCM. An air intake means AIM is located in the bottom shelf.

An automatic watering/feeding means AWFM has two output spouts OS1 and OS2 positioned in such manner that liquid squirted out of these spouts will go into the pots of potted plants PP1 and PP2, respectively. A connect cord CC3 connects the automatic watering/feeding means with the programmable power supply means.

Figure 2:
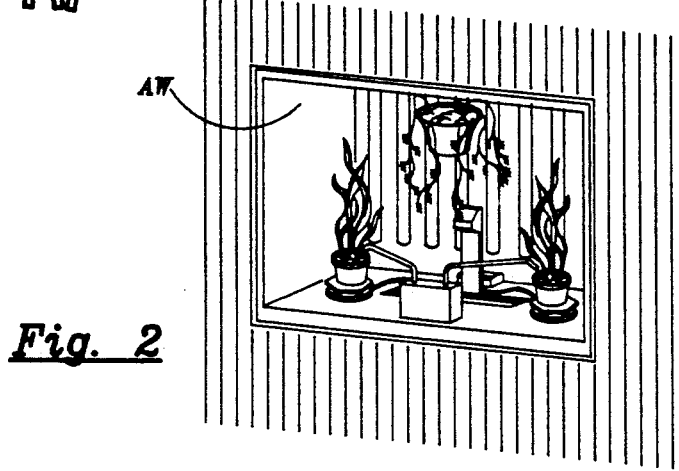
FIG. 2 illustrates an alternative embodiment of the invention.

FIG. 2 illustrates the invention in the form of a backlit artificial window AW in a room. Except for being built into the wall, this artificial window is substantially identical with the invention as illustrated by FIG. 1.

Figure 3A:
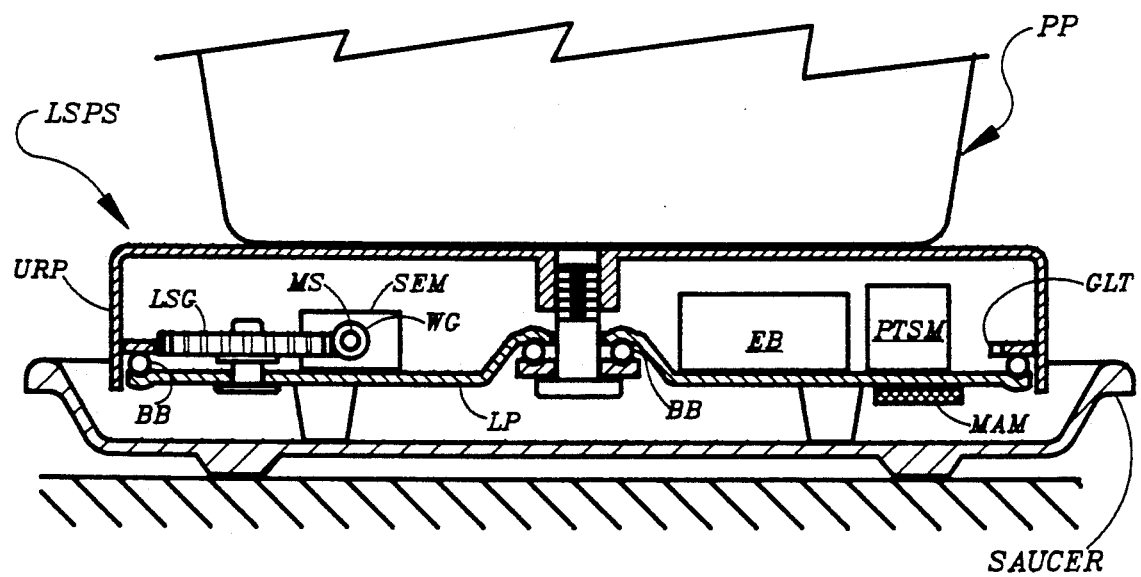
FIGS. 3a and 3b show details of a key part of the invention.
Figure 3B:
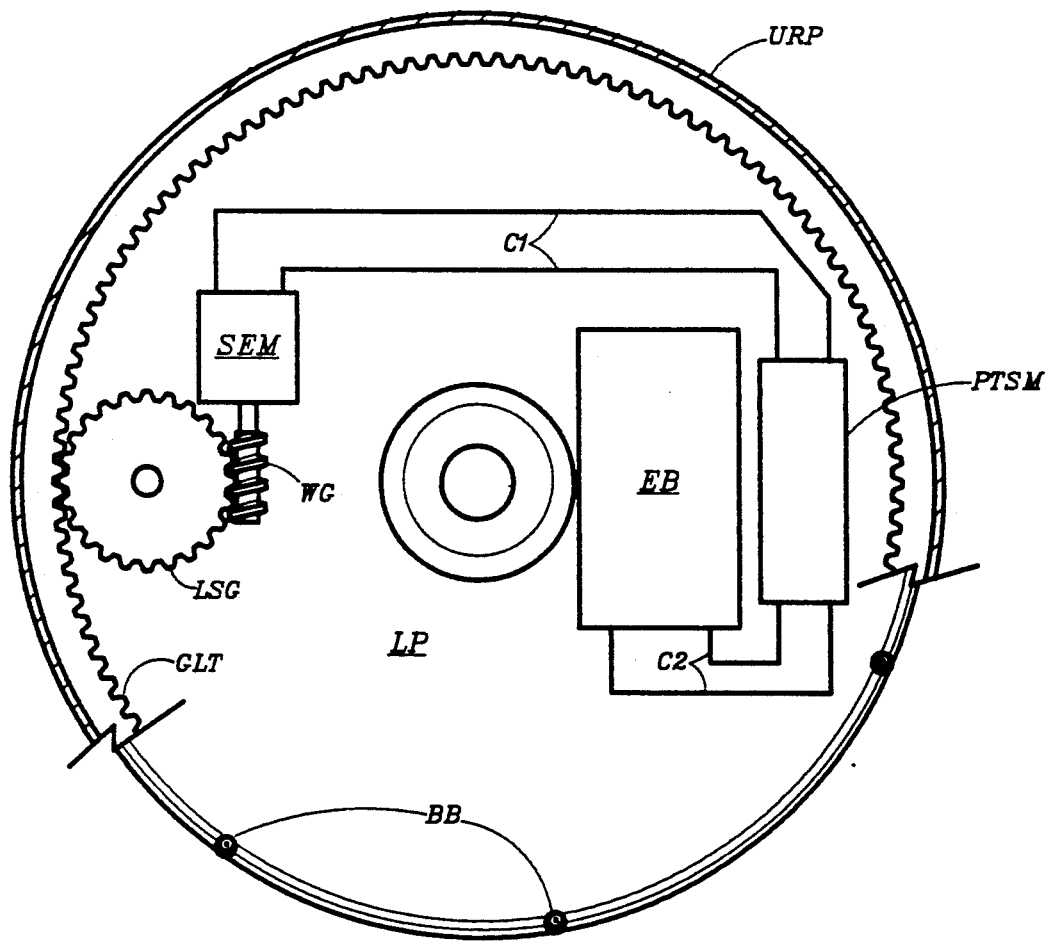

FIG. 3a and FIG. 3b respectively, provide schematic vertical and horizontal cross-sectional views of the preferred version of the rotating pot bases.

In FIG. 3, a potted plant PP is placed upon a lazy-Susan-like platform structure LSPS that comprises a lower part LP on which is mounted a small electric motor SEM with a motor shaft MS. On this motor shaft is mounted a worm gear WG; which worm gear engages a relatively large spur gear LSG; which spur gear, in turn, engages gear-like teeth GLT on the inside of an upper rotatable part of platform URP. The upper rotatable part URP rotatably connects with lower part LP by way of ball bearings BB.

The small electric motor SEM connects electrically with a programmable timer-switcher means PTSM by means of conductors C1; and the programmable timer-switcher means connects with an electric battery EB by means of conductors C2. A manual adjustment means MAM protrudes from the programmable timer-switcher means such as to be accessible from the underside of the lower part LP.

DETAILS OF OPERATION OF PREFERRED EMBODIMENT

In the arrangement of FIG. 1, with power cord PCM plugged into receptacle WRM, the plural fluorescent lamps will emit light of a type conducive to effective plant growth. Due to reflector means HRM covering the inside of the shelf, and as long as folding door FDM is closed, by far the larger part of this light will impinge upon potted plants PP1, PP2 and PP3, thereby maximally promoting their growth.

However, especially with folding door FDM open, this light will not hit the plants evenly, thereby giving rise to uneven growth. To mitigate this problem, by providing an averaging effect, the potted plants are made to rotate so as to make about one revolution per day. This rotation is accomplished by way of the pot-bases and the pot-hanger; which pot-bases and pot-hanger each comprises electric motor means so arranged as to cause rotational movement of the pot-bases and the pot-hanger whenever power is provided from the programmable power supply PPSM. In turn, this power is automatically provided from time-to-time in a manner programmed into the power supply.

Whenever the folding doors are left open, the temperature of the air surrounding the plants will be close to that of the room within which the shelf in placed. However, when the folding doors are closed, due to the heat produced by the fluorescent lamps, the temperature of the air inside the shelf may become unacceptably high. Thermostat TCM senses this temperature and, whenever the temperature exceeds a preset level, causes the ventilating fans to become activated, thereby causing outside air to be sucked in through air intake AIM, thereby keeping the temperature acceptably low.

Whenever required, water and/or plant food is poured into automatic watering/feeding means AWFM; which watering/feeding means will, by way of output spouts OS1 and OS2, and whenever provided with power from power supply PPSM, squirt water/feed liquid into each of the potted plants. The frequency and duration of the periods when power is supplied from power supply PPSM to watering/feeding means AWFM can be programmed into the power supply independently of the program related to the rotation of the pot-bases and the pot-hanger.

The intensity of the light provided from within the shelf is so high that, under normal room-ambient light, the plants within the shelf are clearly and readily visible through the one-way mirror of the folding door, even though that one-way mirror provides for only about 10% light transmission.

Details of Operation of Rotating Pot Bases

When small electric motor SEM of FIG. 3 is actuated, its motor shaft MS rotates and, in turn, causes upper rotatable part URP to rotate relative to lower part LP. Thus, with lazy-Suzan-like platform structure LSPT placed on a stationary base, such as a table, the upper rotatable part URP will rotate very slowly whenever small electric motor SEM is actuated.

The small electric motor is actuated in accordance with a time-pattern programmed into programmable timer-switcher means PTSM. The actuation is accomplished by providing for the small electric motor to be connected for a brief period to electric battery EB at certain pre-programmed times.

In particular, once every 24 hours or so—for a period having a duration adjustable via manual adjustment means MAM from about one second to about one minute—the small electric motor is actuated; which means that, once every 24 hours, potted plant PP is rotated by a small amount: from a few degrees of arc to a significant fraction of a complete revolution, depending on the particular setting of the manual adjustment means.

The arrangement of FIG. 3 is intended to be placed on a substantially horizontal fixed base and used with a potted plant standing on top of the lazy-Susan-like platform structure LSPS.

Additional Comments (a) Programmable power supply means PPSM may be powered by way of connection with wall receptacle means WRM, as by way of power cord means PCM; or, as illustrated by FIG. 3, it may be powered by built-in battery means. In either case, it would comprise clock means operative to permit accurate time-based independent programming of rotating pot-bases/hanger RPB1/RPB2/RPH as well as of automatic watering-/feeding means AWFM.

(b) In some situations it will be advantageous to include independent ON/OFF control of the fluorescent lamps as part of the functions of the programming means. This may be accomplished, for instance, by powering ballast means BM by way of programmable power supply means PPSM; which, of course, would then have to be made such as to provide for independent programmable control of the power supplied to the ballasting means.

(c) Also, it will sometimes be advantageous to provide for dimming of the fluorescent lamps; which function may be accomplished by providing for a dimmable ballast means.

(d) Subject plant rejuvenator may be provided in a wide variety of types, shapes and sizes: from a small portable unit operable to accomodate but a single plant, to a built-in unit occupying a whole closet or even a separate room in a home; from wall-hung units to table-top units to floor-standing units; from a relatively small built-in artificial window to a unit covering one or more complete walls of a room, including units or systems for homes, offices, factories, hotels, restaurants, hospitals, schools, lobbies, etc.

(e) Rotating pot-bases (ex: RPB1) and rotating pot-hangers (ex: RPH) have important applications aside from subject plant rejuvenator system. By way of built-in battery means, motor means, and (programmable) timer means, complete stand-alone automatically rotating pot-bases, pot-hangers, pots, etc. may be provided; which products would have utility wherever it be desirable to provide for automatic rotation of plants, etc.

Since only a few degrees of rotation per day (ex: 15 degrees) would normally be needed, the built-in battery would have a very long service life—readily more than five years when using special long-life batteries.

(f) By providing for thermal insulation in the walls and door of the plant rejuvenator, a unit can be provided for use out-of-doors in winter. The heat from the lamps would be sufficient to maintain adequate temperatures within the plant rejuvenator even if the outdoor temperature were to fall to well below zero degrees Fahrenheit.

In fact, for some applications, such as for decorative plant arrangements located at the entrance to a home or an office, it would be advantageous to provide for a plant rejuvenator that is enclosed in thermally-insulating glass, thereby providing for clear visibility of the enclosed plants from all angles.

(g) Although in its basic preferred embodiment the plant rejuvenator is designed such as to provide for easy removal and replacement of potted plants, in some applications or situations—such as where the plants are not to be removed for extended periods of time—the automatically rotating pot-bases may advantageously be replaced with automatically rotating pots; which pots should be made in such a way as to have a highly reflective exterior surface.

(h) While the use of a reflective or (one-way) mirror-type door (ex: FDM) would be important for purposes of improved energy-efficiency, it might be disadvantageous for situations where the plant rejuvenator be used for displaying the plants placed therein.

(i) Small electric motor SEM, as well as programmable timer-switcher means PTSM, constitute well known devices and have been extensively described in numerous prior art documents, such as for instance in U.S. Pat. Nos. 4,259,618, 4,645,942 and 4,712,019 to Nilssen.

(j) Since the programmable timer-switcher means must by basic necessity comprise clock means, it would is readily feasible to arrange for the position of upper rotatable part URP—with respect to lower part LP—to indicate time, such as day of the week. Thus, by merely providing for dial markings of some kind on the upper rotatable part (URP) and a fixed indicator means on the lower part (LP), the lazy-Susan-like platform structure LSPS of FIG. 3 may serve the additional function of a time-keeping means.

Moreover, a reminder function may be provided—for instance: a reminder to water the plants each time a special marker, or word such as WATER, aligns with the pointer.

In fact, the indicated reminder function could be carried a step further in that means could readily be provided whereby the small electric motor could additionally be used for operating a pump; which pump could be used for watering the plant from a nearby reservoir (ex: a small decorative bucket or a special compartment in the flower pot) by a small amount each time the motor got actuated.

(k) It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:

1. An arrangement comprising:
    stationary base means;
    rotatable platform means positioned on top of and supported by the stationary base means; and
    rotating means located between the stationary base means and the rotatable platform means; the rotating means being: (1) mechanically engaged with both the stationary base means and the rotatable platform means, and (ii) operative to cause the rotatable platform means to be rotated with respect to the stationary base means; the rotating means including an energy source connected with an electric motor by way of an electrically powered timer-switcher means; the timer-switcher means, itself continuously powered from the energy source, being operative to cause the electric motor to be intermittently and repeatedly powered from the energy source for a relatively brief period at a time; each relatively brief period being separated from the next relatively brief period by a relatively long period; the relatively long period being substantially longer than each relatively brief period;
    the arrangement being entirely self-contained and being fully operational as described without requiring connection with any external source of power.

2. The arrangement of claim 1 wherein the energy source is an electric battery.

3. The arrangement of claim 1 wherein: (i) said relatively brief period has a duration on the order of one minute or less; and (ii) said relatively long period has a duration on the order of 24 hours.

4. The arrangement of claim 1 wherein the rotatable platform means includes a potted plant.

5. The arrangement of claim 1 wherein the timer-switcher means is programmable such as to permit programming of the duration said relatively brief periods.

6. The arrangement of claim 1 wherein the timer-switcher means is programmable such as to permit programming of the duration said relatively long periods.

7. The arrangement of claim 1 wherein the duration of said relatively brief period, and/or of said relatively long period, is adjustable.

8. The arrangement of claim 1 wherein: (1) the stationary base means rests on a flat substantially horizontal surface; and (ii) the rotatable platform means is operative to cover the stationary base means, thereby to make it non-visible to a person looking from a position above the platform means.

9. An arrangement comprising:
    stationary base means;
    rotatable platform means positioned on top of and supported by the stationary base mean; and
    rotating means located between the stationary base means and the rotatable platform means; the rotating means being: (i) mechanically engaged with both the stationary base means and the rotatable platform means, and (ii) operative to cause the rotatable platform means to be intermittently rotated with respect to the stationary base means; the rotating means including an energy source connected with an electric motor by way of an automatically actuated switcher means; the switcher means, itself continuously powered from the energy source, being operative to cause the electric motor to be intermittently powered from the energy source;

the arrangement being entirely self-contained and being fully operational as described without requiring connection with any external source of power.

10. The arrangement of claim 9 wherein the automatically actuated switcher means is operative to cause the rotatable platform means to be rotated by a few degrees of arc once every 24 hours or so.

11. The arrangement of claim 9 wherein the automatically actuated switcher means is operative periodically to cause the rotatable platform to rotate in steps of a few degrees of arc, with each such step being repeated after a manifest delay.

12. The arrangement of claim 9 wherein the position of the rotatable platform means relative to the stationary base means is an indication of time, such as the day of the week.

13. The arrangement of claim 9 wherein the source of energy is an ordinary electric battery.

14. An arrangement comprising:

stationary base means;

rotatable platform means positioned on top of and supported by the stationary base means; and rotating means disposed between the stationary base means and the rotatable platform means; the rotating means being: (i) mechanically engaged with both the stationary base means and the rotatable platform means, and (ii) operative to cause the rotatable platform means to be intermittently rotated with respect to the stationary base means; the rotating means including an electric energy source connected with an electric motor by way of an automatically actuated switcher means; the switcher means being: (i) itself continuously powered from the energy source, and (ii) operative intermittently to cause the electric motor to be powered from the electric energy source;

the arrangement being entirely self-contained, requiring no connection with any other source of energy.

* * * * *